(12) United States Patent
Stewart

(10) Patent No.: US 6,731,813 B1
(45) Date of Patent: May 4, 2004

(54) SELF ADAPTING FRAME INTERVALS

(75) Inventor: Ian Stewart, Carpinteria, CA (US)

(73) Assignee: World Multicast.com, Inc., Ventura, CA (US)

( * ) Notice: Subject to any disclaimer, the term of this patent is extended or adjusted under 35 U.S.C. 154(b) by 619 days.

(21) Appl. No.: 09/684,802

(22) Filed: Oct. 6, 2000

Related U.S. Application Data

(60) Provisional application No. 60/158,190, filed on Oct. 7, 1999.

(51) Int. Cl.[7] .................................................. G06K 9/36
(52) U.S. Cl. ........................................................ 382/239
(58) Field of Search ................................ 382/107, 232, 382/236; 348/14.13, 14.15; 380/217, 269; 709/247; 707/101

(56) References Cited

U.S. PATENT DOCUMENTS

| | | | | |
|---|---|---|---|---|
| 5,267,035 A | * | 11/1993 | Weckenbrock et al. | 348/97 |
| 5,479,209 A | | 12/1995 | Miyazaki | 375/240.75 |
| 5,565,920 A | * | 10/1996 | Lee et al. | 375/240.11 |
| 5,754,728 A | * | 5/1998 | Nakajima et al. | 386/68 |
| 5,784,107 A | * | 7/1998 | Takahashi | 375/240.14 |
| 5,825,927 A | | 10/1998 | Boyce et al. | 382/232 |
| 5,832,121 A | | 11/1998 | Ando | 382/236 |
| 5,838,872 A | | 11/1998 | Kawara | 386/68 |
| 5,883,672 A | | 3/1999 | Suzuki et al. | 375/240.04 |
| 6,052,417 A | * | 4/2000 | Fujiwara et al. | 375/240.12 |
| 6,118,817 A | * | 9/2000 | Wang | 375/240.03 |
| 6,249,612 B1 | * | 6/2001 | Ogura | 382/236 |
| 6,335,985 B1 | * | 1/2002 | Sambonsugi et al. | 382/190 |
| 2002/0136301 A1 | * | 9/2002 | Yoneyama et al. | 375/240.13 |

* cited by examiner

Primary Examiner—Andrew W. Johns
Assistant Examiner—Shervin Nakhjavan
(74) Attorney, Agent, or Firm—Black Lowe & Graham PLLC

(57) ABSTRACT

A computer processor implemented video compression method and computer program product for automatically adjusting frame interval during compression of a video signal. The method determines a video motion value from the video signal, determines frame interval according to the determined video motion value, and automatically adjusts the frame interval according to the determined frame interval.

10 Claims, 4 Drawing Sheets

SELF ADAPTING FRAME INTERVALS

Applicant claims priority from U.S. Provisional Application Serial No. 60/158,190, filed Oct. 7, 1999.

FIELD OF THE INVENTION

The present invention relates to video compression and, more particularly, to improving video compression quality.

BACKGROUND OF THE INVENTION

Although the Joint Photographic Experts Group (JPEG) compression standard is very effective at compressing streaming still images, further compression can be achieved using the Motion Picture Experts Group (MPEG) video standard. MPEG augments JPEG with motion compensation, a form of differential encoding, and achieves compression ratios as high as 200 to 1. In MPEG, each frame in a video sequence is encoded. There are three kinds of MPEG video frames: intra (I), predictive (P), and bi-directional predicted (B). I-frames are independent of other frames, and their encoding is almost identical to JPEG. I-frames are encoded using information entirely within the frame-to-be compressed. P-frames are encoded using information both from within the frame-to-be compressed and from the previous I or P-frame. Compression is about 10 times better than for I-frames, but the performance costs are high. B-frames are encoded using information from within the frame, from the previous I or P-frame, and from the following I or P-frame. B-frames generally are compressed to about one sixtieth the size of I-frames, but performance suffers even further. B-frames are never used as a basis for the encoding of other frames. The time it takes to decode each of the three frame types is roughly the same.

Traditional video frame compression works great for talking heads. However, when the motion within a video becomes more dynamic the I-frame interval must be decreased in order to accommodate the higher motion. By decreasing the I-frame interval, the P and B-frames are based on more recently produced I-frames. Presently, adjusting the I-frame rate or interval is a time consuming trial and error, manually-performed process. The video compression in effect is less efficient, thereby making it more costly. Therefore, there exists a need for improving video compression by improving the ability to adjust I-frame rate.

SUMMARY OF THE INVENTION

The present invention provides a computer processor implemented video compression method and computer program product for compressing a video signal. The method determines a video motion value from the video signal, determines frame interval according to the determined video motion value, and compresses at least a portion of the video signal according to the determined frame interval.

In accordance with further aspects of the invention, determining a video motion value includes taking a sample of a frame of the video signal, comparing the sample to one or more previously taken samples, and determining the video motion value according to the comparison.

In accordance with other aspects of the invention, the steps of the process are repeated for frames of the video signal in accordance with a sampling pattern, such as every frame of the video signal.

In accordance with still further aspects of the invention, determining frame interval further includes comparing the determined video motion value to one or more previously determined video motion values. If the determined video motion value differs from the one or more previously determined video motion values by a threshold amount, the method determines frame interval according to the determined video motion value.

In accordance with yet other aspects of the invention, compressing at least a portion of the video signal according to the determined frame interval further includes comparing the frame interval to one or more previously determined frame intervals. If the determined frame interval differs from the one or more previously determined frame intervals by a threshold amount, the method compresses at least a portion of the video signal according to the determined frame interval.

In accordance with still other aspects of the invention, the frame interval is a predictive frame interval or a bi-directional predictive frame interval.

In accordance with further aspects of the invention, compressing at least a portion of the video signal uses at least one of the MPEG compression schemes.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
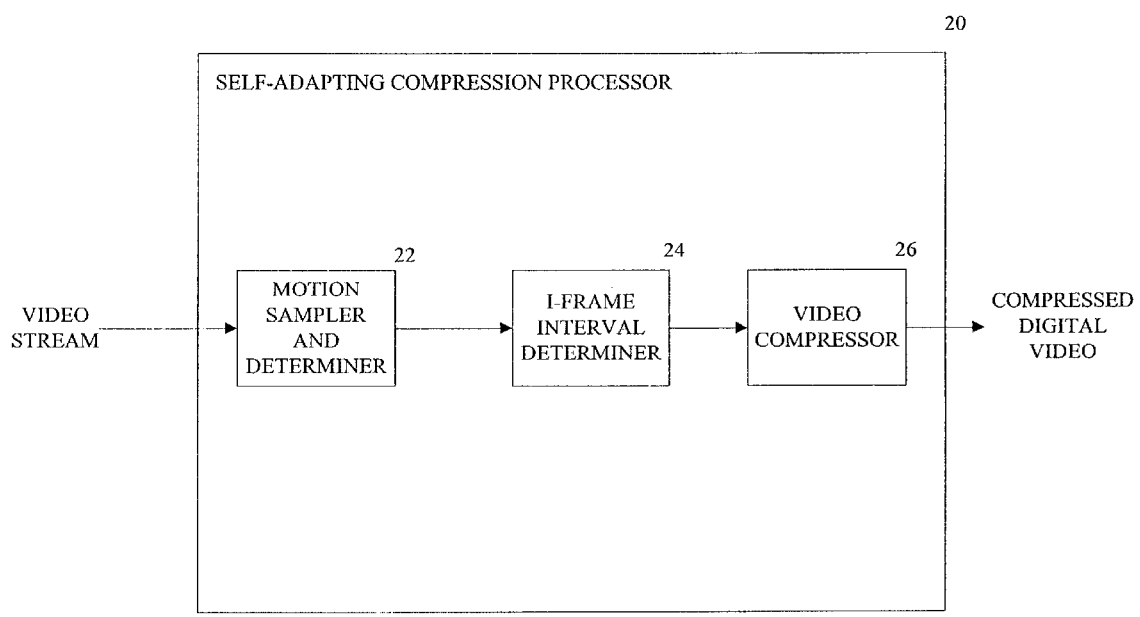
FIG. 1 is a component diagram of the present invention.

The invention provides automatically adapting intervals between I-frames during digital video compression, such as the Motion Pictures Experts Group (MPEG) compression schemes. As shown in FIG. 1, a computer-based self-adapting compression processor 20 includes a motion sampler and determiner component 22 for receiving a framed video stream, an I-frame interval determiner component 24 coupled to the motion sampler and determiner component 22 and a video compressor component 26 coupled to the I-frame interval determiner component 24 for generating a compressed digital video.

Figure 2:
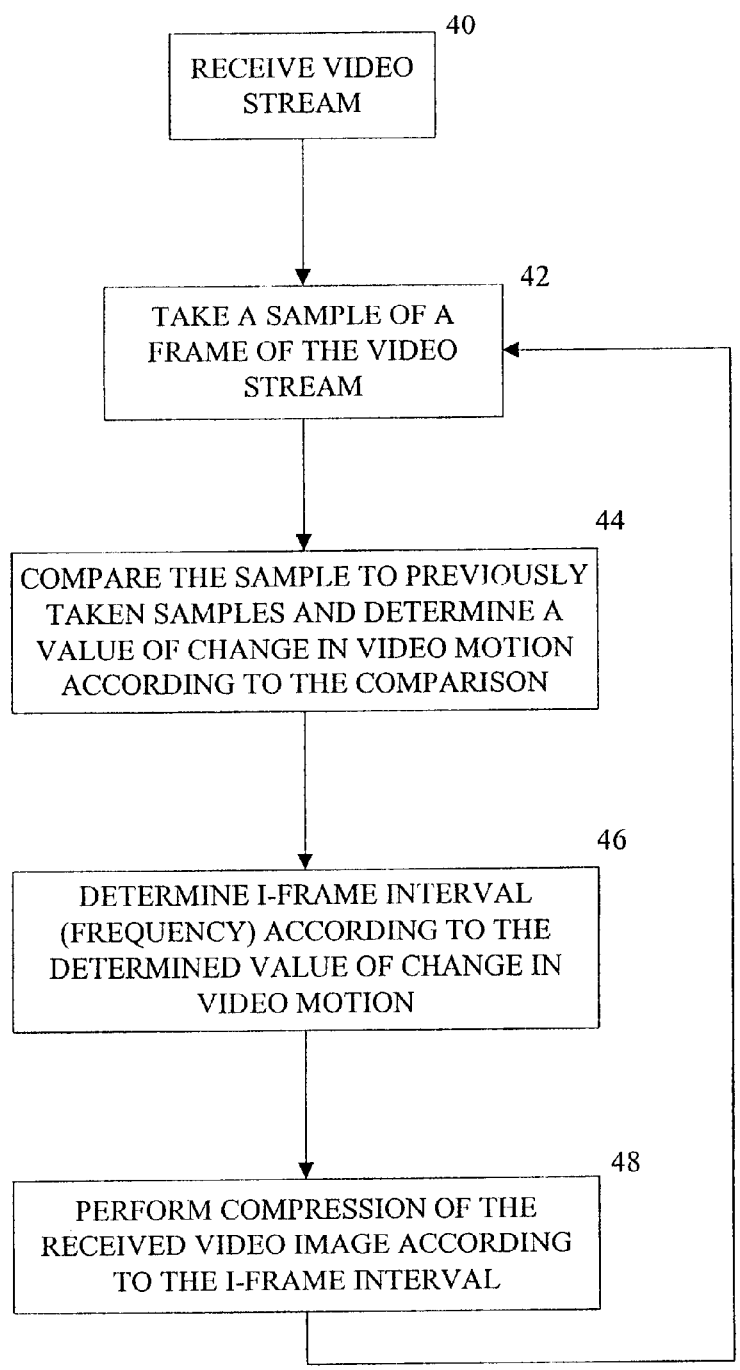
FIGS. 2–4 are flow diagrams of embodiment processes performed by the components illustrated in FIG. 1.

FIG. 2 illustrates a first embodiment of the process performed by the components of FIG. 1. At block 40, the motion sampler and determiner component 22 receives a video stream from a video source. In one embodiment, the video stream is an analog video signal, such as NTSC or PAL. The video stream may be any other type of video signal, analog or digital, that includes frames of still images that require compression for storage or delivery. Next, at block 42, the motion sampler and determiner component 22 takes a sample of a frame of the received video stream. Then, at block 44, the motion sampler and determiner component 22 compares the sample to one or more previously taken samples and determines a value of change in video motion according to the comparison. The MPEG bitstream includes a motion vector and an error term. The error term is the same as the determined value of change in video motion. At block 46, the I-frame interval determiner component 24 determines an I-frame interval (frequency) according to the determined value of change in video motion. At block 48, the video compressor component 26 compresses the received video image according to the determined I-frame interval determination. The process returns to block 42 to take a sample of a successive frame, or of a frame at some interval in time or number of frames from the recently sampled frame.

Figure 3:
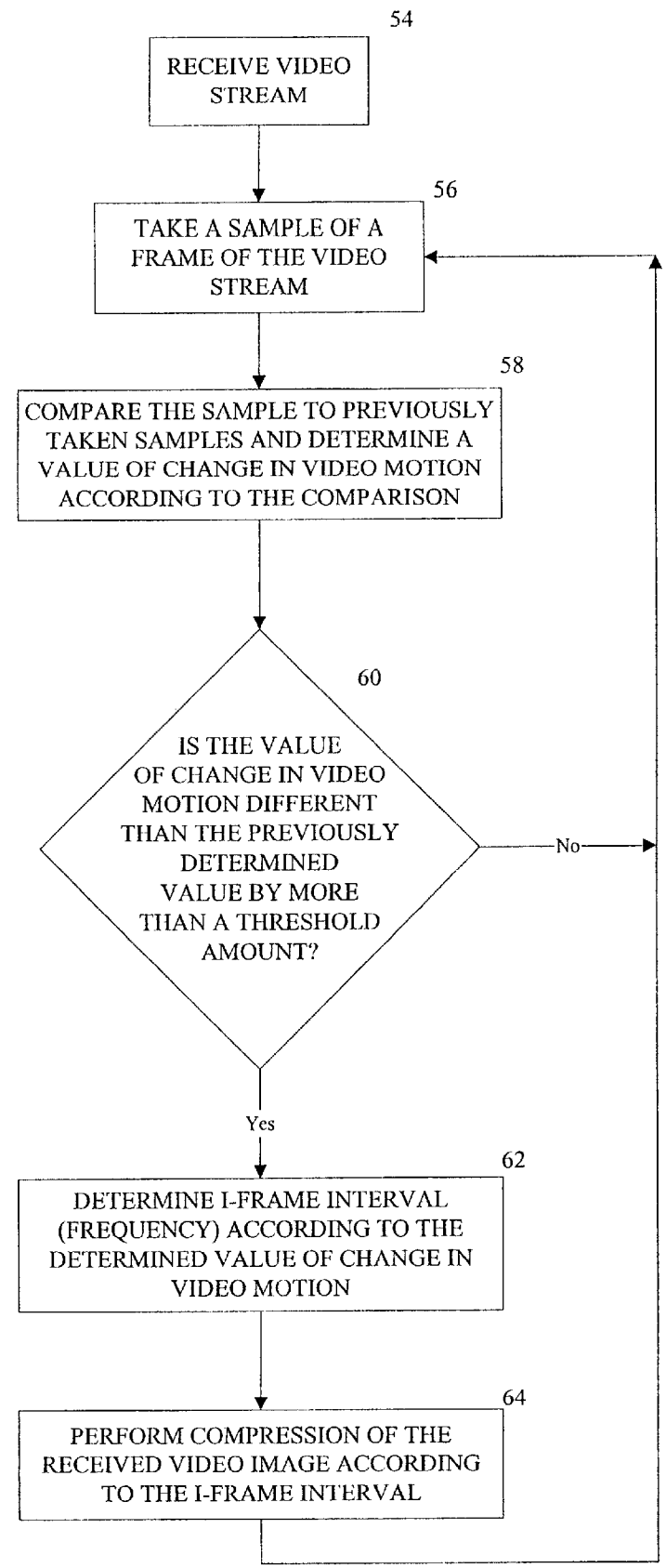

FIG. 3 illustrates an alternate embodiment of the process shown in FIG. 2. The steps shown in blocks 54, 56 and 58 are the same as that described above in FIG. 2 at blocks 40, 42 and 44. After block 58, at decision block 60, the motion sampler and determiner component 22 determines if the value of change in video motion differs from one or more previously determined values by more than a threshold amount. If the most recently determined value of change in video motion does not differ by more than the threshold amount, the process returns to block 56 to take a sample of a successive frame, or of a frame at some interval in time or number of frames from the recently sampled frame. If the most recently determined value of change in video motion does differ by more that the threshold amount, at block 62, the I-frame interval determiner component 24 determines an I-frame interval according to the determined value of change in video motion. At block 64, the video compressor component 26 compresses the received video image according to the determined I-frame interval. The process then returns to block 56 to take a sample of a successive frame, or a frame at some interval in time or number of frames from the recently sampled frame.

Figure 4:
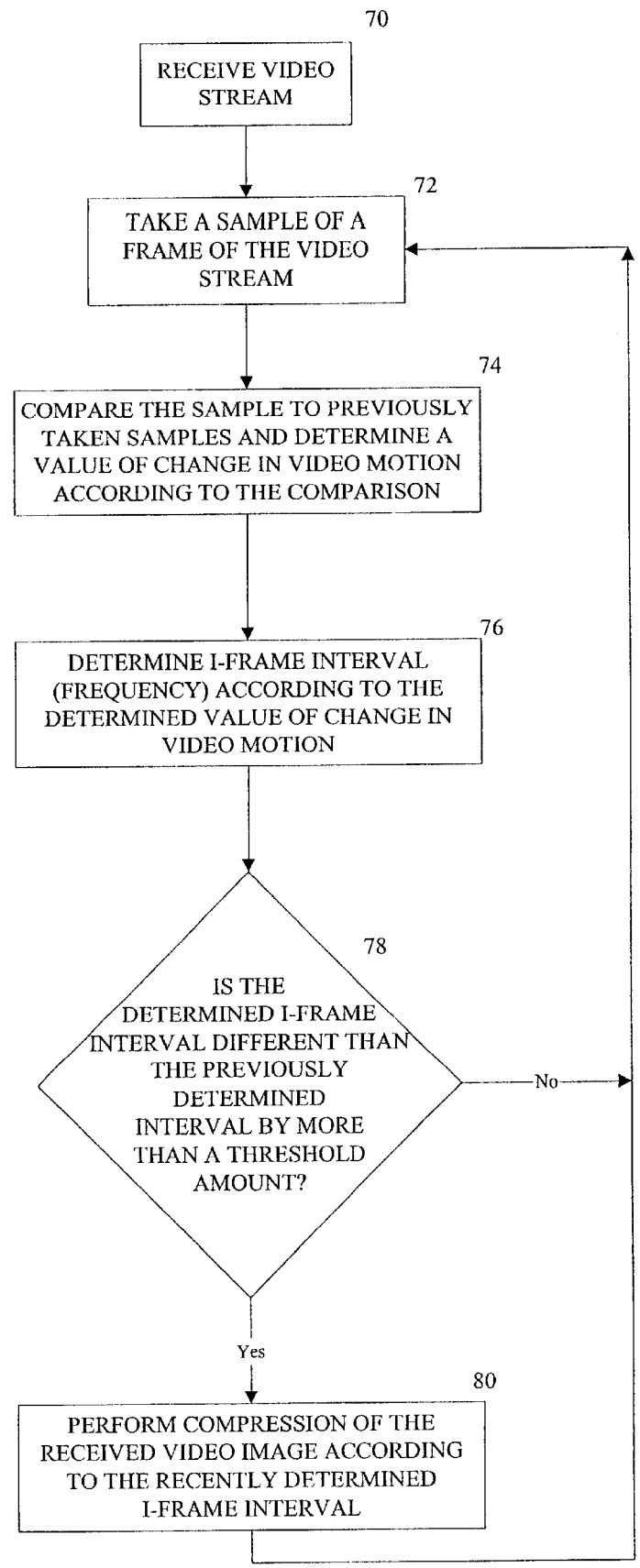

FIG. 4 illustrates another embodiment of the process shown in FIG. 2. The steps shown in blocks 70, 72, 74 and 76 are the same as that described above in FIG. 2 at blocks 40, 42, 44 and 46. After block 76, at decision block 78, the I-frame interval determiner component 24 determines if the determined I-frame interval differs from one or more previously determined intervals by more than an interval threshold amount. If the most recently determined interval does not differ by more than the interval threshold amount, the process returns to block 72 to take a sample of a successive frame, or a frame at some interval in time or number of frames from the recently sampled frame. If the most recently determined interval does differ by more that the interval threshold amount, at block 80, the video compressor component 26 compresses the received video image according to the most recently determined I-frame interval determination. The process then returns to block 72 to take a sample of a successive frame, or a frame at some interval in time or number of frames from the recently sampled frame.

The steps described in FIGS. 2–4 may be performed in a multiple of different orders without departing from the scope of the present invention.

While the preferred embodiment of the invention has been illustrated and described, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for automatically adjusting frame interval between frames of digital video during compression of a received video signal comprising:

a) determining a video motion value from the video signal;

b) determining frame interval according to the determined video motion value; and c) automatically adjusting the frame interval according to the determined frame interval, wherein determining a video motion value comprises:

taking a sample of a frame of the video signal, comparing the sample to one or more previously taken frame samples; and determining the video motion value according to the comparison.

2. The method of claim 1, further comprising:

repeating a–c for other frames of the video signal in accordance with a predetermined sampling pattern.

3. The method of claim 2, wherein the sampling pattern is every frame of the video signal.

4. A computer program product for performing the process of claim 3.

5. A computer program product for performing the process of claim 2.

6. The method of claim 1, wherein determining frame interval further comprises:

comparing the determined video motion value to one or more previously determined video motion values, if the determined video motion value differs from the one or more previously determined video motion values by a threshold amount, determining frame interval according to the determined video motion value, and if the determined video motion value does not differ from the one or more previously determined video motion values by the threshold amount, returning to a.

7. A computer program product for performing the process of claim 6.

8. The method of claim 1, wherein compression is performed in accordance with a MPEG compression scheme.

9. A computer program product for performing the process of claim 8.

10. A computer program product for performing the process of claim 1.

\* \* \* \* \*